(12) United States Patent
Koshi (10) Patent No.: US 6,618,521 B2
(45) Date of Patent: Sep. 9, 2003

(54) WAVELENGTH MULTIPLEXING MODULE WITH POLARIZATION MAINTAINING FIBERS AS DEPOLARIZERS

(75) Inventor: Hiroyuki Koshi, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/852,728

(22) Filed: May 11, 2001

(65) Prior Publication Data

US 2002/0025111 A1 Feb. 28, 2002

(30) Foreign Application Priority Data

May 12, 2000 (JP) .................................. 2000-140369
May 7, 2001 (JP) .................................. 2001-136395

(51) Int. Cl.[7] ................................................ G02B 6/28
(52) U.S. Cl. .............................. 385/24; 385/27; 385/11; 385/37; 359/122; 359/333; 359/341
(58) Field of Search ................. 385/11, 27, 24, 385/37; 359/122, 333, 154, 341

(56) References Cited

U.S. PATENT DOCUMENTS

| | | | | |
|---|---|---|---|---|
| 4,572,608 A | * | 2/1986 | Mochizuki et al. | 385/11 |
| 5,111,322 A | * | 5/1992 | Bergano et al. | 359/122 |
| 5,335,064 A | * | 8/1994 | Nishiura et al. | 356/460 |
| 5,345,331 A | * | 9/1994 | Bergano et al. | 359/341.31 |
| 6,429,965 B1 | * | 8/2002 | Falquier et al. | 359/341.1 |
| 2002/0024704 A1 | * | 2/2002 | Erdogan et al. | 359/156 |
| 2002/0028760 A1 | * | 3/2002 | Konkel et al. | 514/1 |

FOREIGN PATENT DOCUMENTS

JP 10-62308 3/1998

OTHER PUBLICATIONS

K. Boehm, et al., Journal of Lightwave Technology, vol. Lt–1, No. 1, pps. 71–74, "Performance of Lyot Depolarizers With Birefringent Single–Mode Fibers", Mar. 1983.
K. Tanaka, et al., OFC/IOCC'99, pps. 88–90, "Low Loss Integrated Mach–Zehnder–Interferometer–Type Eight–Wavelength Multiplexer for 1480 NM Band Pumping," Feb. 23, 1999.

* cited by examiner

Primary Examiner—Hemang Sanghavi
Assistant Examiner—Eric Wong
(74) Attorney, Agent, or Firm—Oblon, Spivak, McClelland, Maier & Neustadt, P.C.

(57) ABSTRACT

Disclosed is a wavelength multiplexing module which provides stable multiplexed output power. The wavelength multiplexing module comprises a plurality of pumping sources for outputting lights of different wavelengths, and a wavelength multiplexer for multiplexing the lights output from the pumping sources. The wavelength multiplexer is provided with optical input sections for respectively receiving the lights output from the pumping sources. Respectively provided between the optical input sections and the pumping sources are depolarizers each of which causes a degree of polarization of the light output from an associated one of the pumping sources to approach zero. Each depolarizer has two polarization-maintaining optical fibers connected in series on an optical path in such a way that primary optic axes of the polarization-maintaining optical fibers obliquely intersect each other.

3 Claims, 9 Drawing Sheets

PRIOR ART

WAVELENGTH MULTIPLEXING MODULE WITH POLARIZATION MAINTAINING FIBERS AS DEPOLARIZERS

BACKGROUND OF THE INVENTION

Due to the recent vast increase in Internet traffic density, it is urgent to meet the demand of increasing the communication network capacity. One solution to fulfill this demand is the DWDM (Dense Wavelength Division Multiplexing) technique in whose development the U.S.A. and Canada have taken a leading role. As the DWDM technique transmits optical signals of different wavelengths division-multiplexed in a dense form over a single optical fiber, the transmission capacity can be increased by the degree of wavelength division multiplexing. Because of the feature, attention is being focused on the DWDM technique.

SUMMARY OF THE INVENTION

Accordingly, it is an object of the present invention to provide a wavelength multiplexing module which is adaptable to DWDM transmission.

A wavelength multiplexing module according to one aspect of the invention comprises:

- a plurality of pumping sources for outputting lights of different wavelengths;
- a wavelength multiplexer for multiplexing the lights output from the pumping sources, the wavelength multiplexer having optical input sections for respectively receiving the lights output from the pumping sources; and
- depolarizers, respectively provided between the optical input sections and the pumping sources,
  - wherein each of the depolarizer causes a degree of polarization of the light output from an associated one of the pumping sources to approach zero.

BRIEF DESCRIPTION OF THE DRAWINGS

Exemplified embodiments of the invention will now be described in conjunction with drawings in which.

DETAILED DESCRIPTION OF THE PREFERRED EMBODIMENTS

Figure 11:
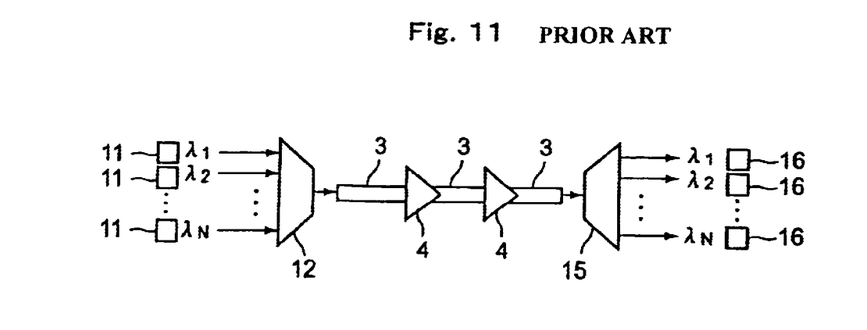
FIG. 11 is an exemplary diagram exemplifying the structure of a wavelength multiplexing transmission system.

FIG. 11 exemplifies the structure of a wavelength multiplexing transmission system, such as a DWDM type. As shown in FIG. 11, the wavelength multiplexing transmission system has a plurality of signal sources 11, a wavelength multiplexing unit 12, an optical fiber 3, optical amplifiers 4, a wavelength demultiplexing unit 15 and photo-detectors 16.

The signal sources 11 output lights of different wavelengths ($\lambda_1$, $\lambda_2$, ..., and $\lambda_N$ in FIG. 11). The wavelength multiplexing unit 12 has an optical multiplexer which multiplexes a plurality of lights of different wavelengths emitted from the respective signal sources 11. The optical fiber 3 transmits the wavelength-multiplexed light that has been multiplexed by the wavelength multiplexing unit 12. The wavelength-multiplexed light that travels in the optical fiber 3 propagates while being amplified by the optical amplifiers 4. The wavelength demultiplexing unit 15 demultiplexes the wavelength-multiplexed light that has traveled in the optical fiber 3, wavelength by wavelength. The photo-detectors 16 receive lights of the respective wavelengths demultiplexed by the wavelength demultiplexing unit 15.

The wavelength multiplexing transmission system that is currently developed transmits wavelength-multiplexed light in the wavelength band of 1.55 $\mu$m (1550 nm). Therefore, the individual signal sources 11 are so constructed as to output lights of different wavelengths in the wavelength band of 1.55 $\mu$m. To further increase the communication capacity, studies have recently been made on expansion of the transmission band to the wavelength band of 1.50 $\mu$m (S band) and the wavelength band of 1.60 $\mu$m (L band) from the wavelength band of 1.55 $\mu$m (C band).

Realization of a wavelength multiplexing transmission system requires optical devices, such as the wavelength multiplexing unit 12 and the wavelength demultiplexing unit 15. The technical problems of the existing optical devices which are used in optical communications to realize the system, such as the signal source 11, the optical fiber 3, the optical amplifier 4 and the photo-detector 16, are changing. Particularly, the optical amplification characteristic of the optical amplifier 4 significantly affects the transmission distance of wavelength-multiplexed light in a wavelength multiplexing transmission system and the quantity of lights to be wavelength-multiplexed. Therefore, there is a strong demand of an improvement on the optical amplification characteristic of the optical amplifier 4.

Figure 12:
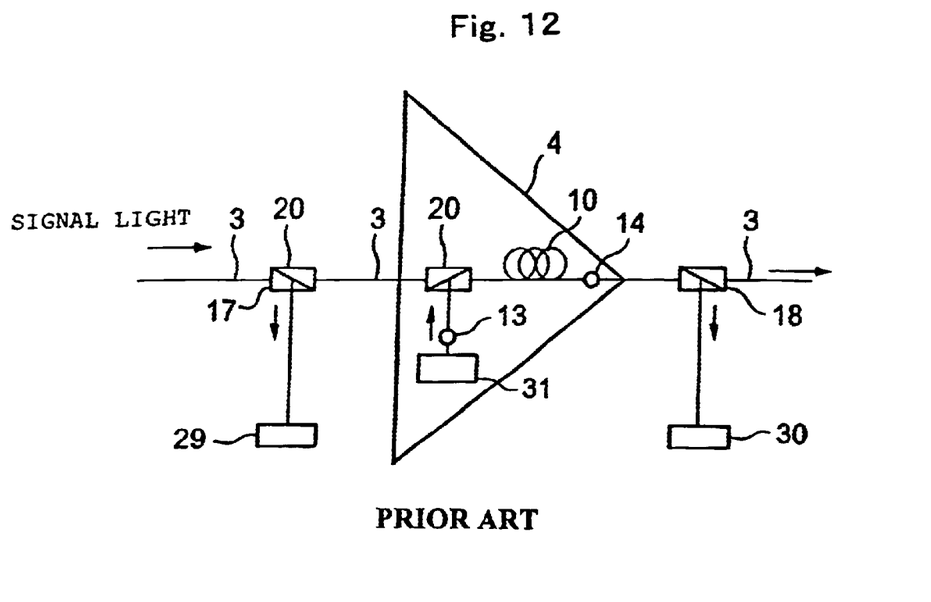
FIG. 12 is an explanatory diagram showing an example of the structure of an optical amplifier as adapted to the wavelength multiplexing transmission system.

FIG. 12 exemplifies the basic structure of the optical amplifier 4 to be adapted to the wavelength multiplexing transmission system. The optical amplifier 4 is an optical fiber type optical amplifier having an Erbium-doped optical fiber amplifier 10. As shown in FIG. 12, this type of optical amplifier 4 has a pumping source apparatus 31, an optical multiplexer 20, the Er-doped optical fiber amplifier 10 and optical isolators 13 and 14. The optical multiplexer 20 multiplexes the pumping light emitted from the pumping source apparatus 31 with signal light.

The bands of the output wavelength of the pumping source apparatus 31 that have been developed in association with the gain band of the Er-doped optical fiber amplifier 10 are generally the 1480 nm band and the 980 nm band. Either one of the bands is selectively used in accordance with the purpose of the usage of the pumping source apparatus 31. As shown in FIG. 12, generally, a signal-light intensity monitoring mechanism which has an optical demultiplexer 17 and a photodiode 29 and a signal-light intensity monitoring mechanism which has an optical demultiplexer 18 and a photodiode 30 are respectively provided on the light-incident side and the light-outgoing side of the optical amplifier 4. Based on the signal-light intensities detected by the signal-light intensity monitoring mechanisms, the optical output of the pumping source apparatus 31 undergoes feedback control.

To improve the optical amplification characteristic of the optical amplifier 4 with the above-described structure, it is essential to increase the output power of the pumping source apparatus 31 (as published in, for example, C-3-107, 1999 by the IEICE (Institute of Electronics, Information and Communication Engineers) society in Japan. There is a pumping source apparatus 31 which has been developed to make the output power of the pumping source apparatus 31 higher than the output power of a single laser diode. The pumping source apparatus employs a technique of polarization-multiplexing pumping lights, emitted from two laser diodes, by polarization beam splitters.

Recently, attention is paid to the wavelength multiplexing pumping technique that multiplexes three or more pumping lights by using a WDM coupler. Studies are being made on application of this technique to a pumping source apparatus. The wavelength multiplexing pumping technique has been reported in, for example, TuH5, OFC '99 in the U.S.A. and OPE99-10,57,1999 of IEICE in Japan.

Figure 13:
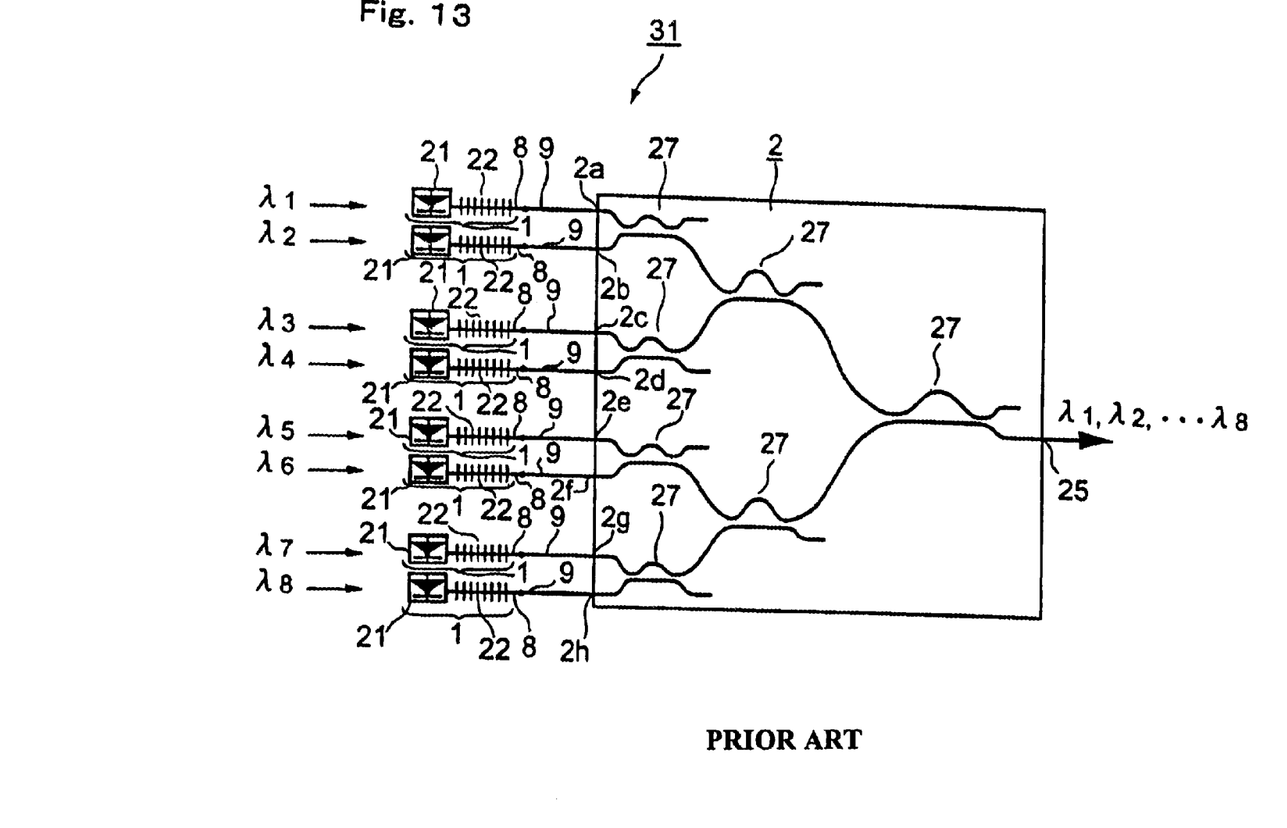
FIG. 13 is an explanatory diagram exemplifying a conventional wavelength multiplexing module.

FIG. 13 exemplifies the basic structure of a wavelength multiplexing module (pumping source apparatus) 31 which has been designed by using the wavelength multiplexing pumping technique. As shown in FIG. 13, the wavelength multiplexing module 31 has a plurality of pumping sources 1 which output lights of different wavelengths and a wavelength multiplexer 2 which multiplexes the lights output from the pumping sources 1. The wavelength multiplexer 2 has a plurality of optical input sections 2a to 2h which respectively receive the output lights of the pumping sources 1 and a single optical output section 25 which outputs multiplexed light.

In the example in FIG. 13, the wavelength multiplexer 2 is a WDM coupler which has a plurality of Mach-Zehnder interferometer type wavelength multiplexing means 27 prepared by the PLC (Planar Lightwave Circuit) technology, and has a low loss. Single-mode optical input fibers 9 are respectively connected to the optical input sections 2a to 2h of the wavelength multiplexer 2.

Each pumping source 1 has a laser diode 21 and a pumping-light output fiber 8. The pumping-light output fiber 8 has a fiber grating 22 formed thereon. The wavelengths of reflection lights from the individual fiber gratings 22 are different from one another (eight wavelengths $\lambda_1, \lambda_2, \lambda_3, \ldots, \lambda_8$ in FIG. 13). The fiber gratings 22 are designed to reflect the output lights of the associated laser diodes 21. The reflectances of the reflection lights are, for example, several percent.

Each fiber grating 22 serves as an external resonator of the associated laser diode 21. This external-resonator capability of the fiber grating 22 can permit the reflection light from the fiber grating 22 to be output from the associated pumping source 1 in a narrow spectral width. This makes the oscillation spectrum of each pumping source 1 narrower than the transmission bandwidth of the wavelength multiplexer 2 and stabilizes that oscillation spectrum.

The above-described structure of the wavelength multiplexing module 31 can multiplex the wavelengths of the lights from multiple pumping sources 1 at a low loss. Because the optical output section 25 of the wavelength multiplexing module 31 can provide high output power of more than 1 Watt, it is expected to make the practical use of the wavelength multiplexing module 31 as a pumping source apparatus.

Figure 15:
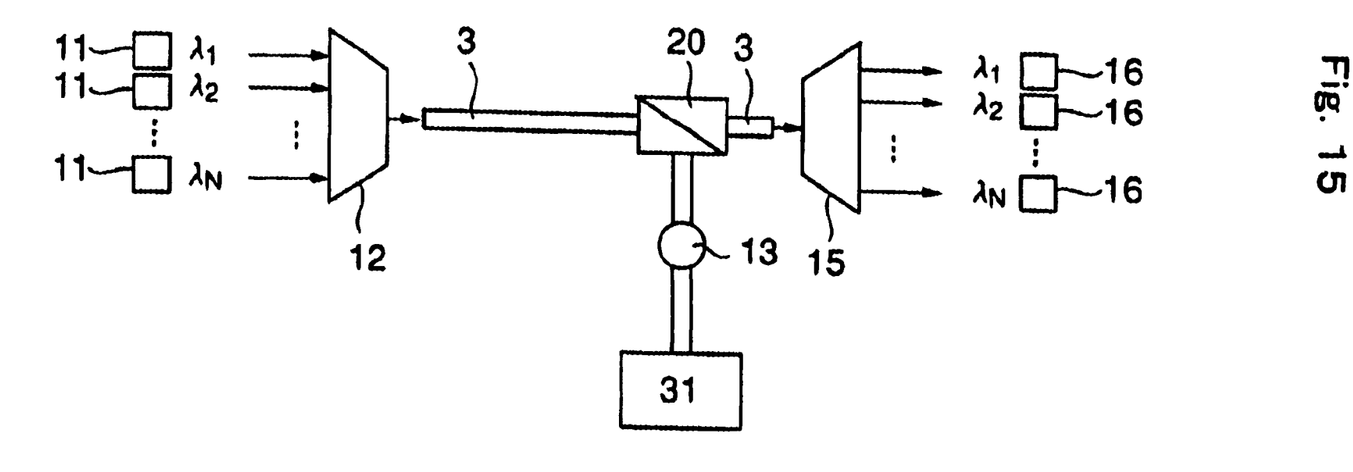
FIG. 15 is an explanatory diagram illustrating the general structure of a wavelength multiplexing transmission system which uses Raman amplification.

Recently, attention is focused on a Raman amplifier which uses the pumping source apparatus 31 as a wavelength multiplexing module 31. FIG. 15 illustrates an example of the structure of a wavelength multiplexing transmission system which uses Raman amplification. The multiplexed pumping light from the wavelength multiplexing module 31 is input via the isolator 13 to the optical fiber 3 at the optical multiplexer 20. As the Raman amplifier can use the optical fiber 3 or a transmission path as an amplification medium and is a distributed amplifier, a high-quality transmission characteristic can be achieved. While the Raman amplification generally does not have a good amplification factor, active studies are being made on using the Raman amplification in the actual field due to the appearance of the wavelength multiplexing module that can have significantly enhanced pumping power (such a study has been reported in, for example, TuF4, OFC2001 in the U.S.A.).

In general, the full intensity of light can be separated into a polarized component and an unpolarized component (depolarized component). The ratio of the polarized component to the full intensity of light is called "degree of polarization".Each of the pumping sources 1 that constitutes the wavelength multiplexing module 31 has a degree of polarization of nearly 100%.

The wavelength multiplexer 2 that constitutes the wavelength multiplexing module 31 generally has a polarization dependent loss (PDL). As pumping light from the pumping source 1 which has a degree of polarization of 100% is incident to the wavelength multiplexer 2 having a PDL, the optical output power of the wavelength multiplexing module 31 significantly varies due to the PDL of the wavelength multiplexer 2.

That is, when lights having a degree of polarization of 100%, such as the optical output of the pumping sources 1, (or lights of the polarized component which has the full intensity) are input to the wavelength multiplexer 2, the polarization states of the lights that travel through the optical input fibers 9 connected to the wavelength multiplexer 2 vary at random before entering the wavelength multiplexer 2 depending on the types of the optical input fibers 9 and the environmental conditions. Depending on the polarization state of the input light, therefore, the insertion loss of the wavelength multiplexer 2 may vary so that the output power of the multiplexed light varies, at the maximum, by the equivalent amount to the PDL of the wavelength multiplexer 2.

Figure 14:
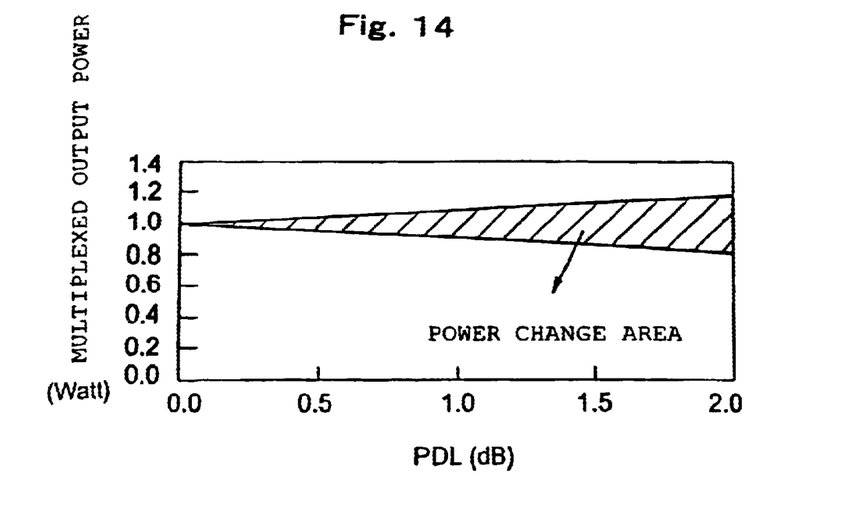
FIG. 14 is a graph showing the relationship between a polarization dependent loss (PDL) of a wavelength multiplexer in the conventional wavelength multiplexing module and a change in the output power of the wavelength multiplexer.

FIG. 14 shows the relationship between the value of the PDL of the wavelength multiplexer 2 and the output power of the light multiplexed by the wavelength multiplexer 2. It is apparent from FIG. 14 that the larger the value of the PDL of the wavelength multiplexer 2 is, the greater a variation in the output power of the multiplexed light is.

When the output power of the light multiplexed by the wavelength multiplexer 2 in the wavelength multiplexing module 31 changes, the amplification factor of the optical amplifier 4 that has the wavelength multiplexing module 31 varies accordingly. This unstabilizes the intensity of the transmission light in the wavelength multiplexing transmission system as shown in FIG. 11, making it difficult to construct a high-quality wavelength multiplexing transmission system. The same is true of a wavelength multiplexing transmission system using the Raman amplification (FIG. 15) in which case a variation in the power of the multiplexed pumping light from the wavelength multiplexing module 31 changes the amplification factor, thus deteriorating the transmission quality.

According to one aspect of the invention, there is provided a wavelength multiplexing module capable of outputting stable high-power multiplexed light by multiplexing lights of different wavelengths. The adaptation of the wavelength multiplexing module to an optical amplifier can help construct a high-quality wavelength multiplexing transmission system which has a stable signal light intensity.

In the wavelength multiplexing module according to one aspect of the invention that has the above-described structure, depolarizers each of which causes the degree of polarization of the light output from the associated pumping source to approach zero are respectively provided between a plurality of pumping sources which output lights of different wavelengths, and the optical input sections of a wavelength multiplexer which multiplexes the lights output from the pumping sources. Accordingly, the light output from each pumping source is nearly depolarized by the associated depolarizer before entering the wavelength multiplexer.

As a result, the wavelength-multiplexed pumping light which is output from the wavelength multiplexer is not affected by the PDL of the wavelength multiplexer and has a stable intensity. This makes it possible to suppress a variation in the output wavelength-multiplexed pumping light.

The adaptation of the wavelength multiplexing module to, for example, an optical amplifier provided in a wavelength multiplexing transmission system can construct a high-quality wavelength multiplexing transmission system which has a stable signal light intensity.

Figure 1:
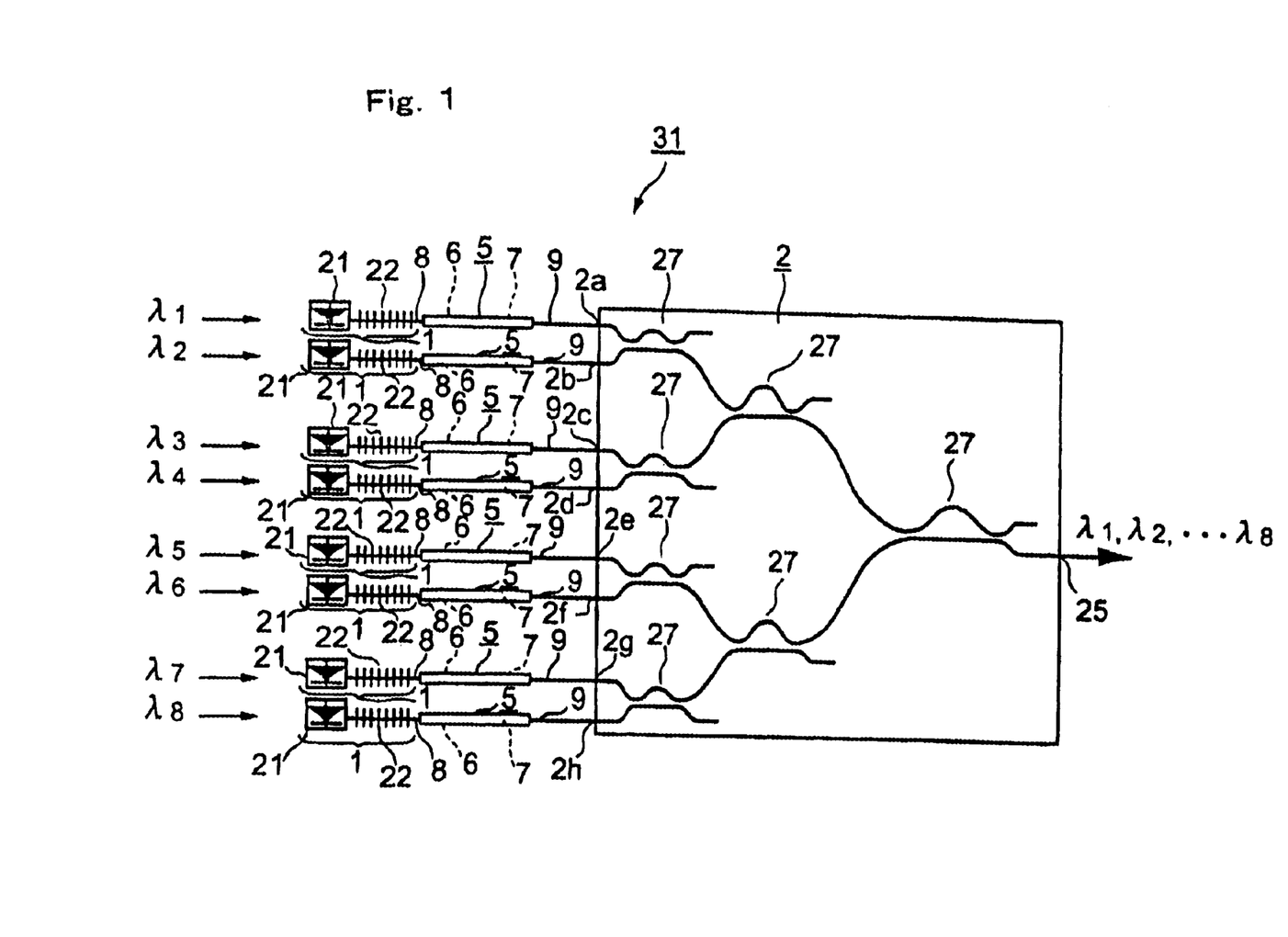
FIG. 1 is an explanatory structural diagram illustrating a first embodiment of a wavelength multiplexing module according to the invention.

FIG. 1 illustrates the first embodiment of a wavelength multiplexing module according to the invention.

Like the conventional wavelength multiplexing module 31 shown in FIG. 13, the wavelength multiplexing module 31 of the first embodiment has a plurality of pumping sources 1 which output lights of different wavelengths and a wavelength multiplexer 2 which multiplexes the lights output from the pumping sources 1. The first embodiment differs from the prior art in that depolarizers 5 which cause the degrees of polarization of the lights output from the associated pumping sources 1 to approach zero are provided between the optical input sections 2a to 2h and the associated pumping sources 1, respectively.

Figure 2:
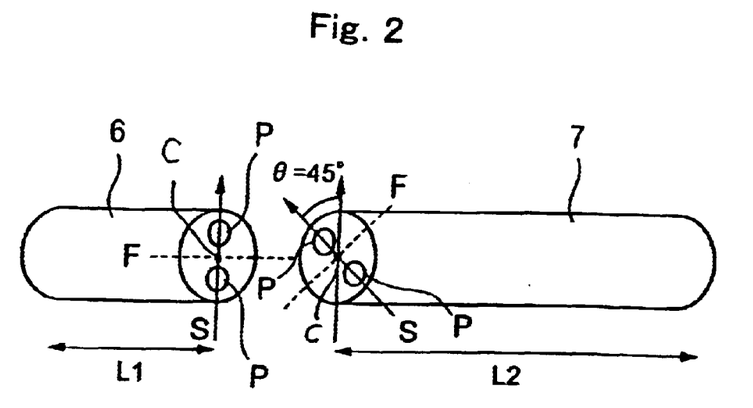
FIG. 2 is an explanatory diagram showing the structure of a depolarizer provided in the embodiment.

Each depolarizer 5 has two polarization-maintaining optical fibers 6 and 7 provided on the optical path. As shown in FIG. 2, the polarization-maintaining optical fibers 6 and 7 are connected in series. Each polarization-maintaining optical fiber has a primary optic axis consisting of a slow axis S and a fast axis F. The slow axis S and the fast axis F crosses each other perpendicularly. The polarization-maintaining optical fibers 6 and 7 connected together in such a way that their primary optic axes obliquely intersect at an angle of 45°. The length $L_1$ of the polarization-maintaining optical fiber 6 on the pumping-source side and the length $L_2$ of the polarization-maintaining optical fiber 7 on the wavelength-multiplexer side have a ratio of $L_1:L_2=1:2$.

The technology of such a fiber type depolarizer that uses polarization-maintaining optical fibers is disclosed in, for example, "K. Bohm et al., IEEE Jour. Lightwave Technology, LT-1, 1, pp. 71–74, March 1983". When linearly polarized light is incident to the primary optic axis of the first polarization-maintaining optical fiber, light is not depolarized. To depolarize lights of all the incident polarization angles, therefore, the polarization-maintaining optical fibers having a length ratio of 1:2 should be connected at an angle of 45° as shown in FIG. 2. The publication describes that the lengths of the polarization-maintaining optical fibers should be adjusted in accordance with the coherence length of the incident light.

There are various structures of polarization-maintaining optical fibers. The polarization-maintaining optical fibers 6 and 7 as shown in FIG. 2 are typical known PANDA fibers. A PANDA fiber is so constructed as to sandwich a core C provided at the center of the optical fiber with stress applying sections P from both sides.

According to the first embodiment of the invention, the pumping lights output from the eight pumping sources 1 have a wavelength bandwidth of 1480 nm and respectively have the center wavelengths of 1450.0 nm ($\lambda_1$), 1457.5 nm ($\lambda_2$), 1465.0 nm ($\lambda_3$), 1472.5 nm ($\lambda_4$), 1480.0 nm ($\lambda_5$), 1487.5 nm ($\lambda_6$), 1495.0 nm ($\lambda_7$) and 1502.5 nm ($\lambda_8$).

In the first embodiment, each pumping source 1 takes the structure of a Fabry-Perot resonator as per the prior art shown in FIG. 13. The Fabry-Perot resonator is designed in such a manner that the fiber grating 22 which reflects light emitted from the laser diode 21 serves as an external resonator. Designing the pumping source 1 as a Fabry-Perot resonator can minimize the insertion loss of the wavelength multiplexer 2 originated from the spectral contraction as well as can stabilize the oscillation wavelength.

As one example, the wavelength multiplexer 2 was prepared using flame hydrolysis deposition and the reactive ion etching technology. In the example, an under-cladding layer of $SiO_2$-based glass with a thickness of, for example, 30 µm was formed on a silicon substrate, a core circuit of $SiO_2$—$TiO_2$-based glass having a relative refractive index difference of 0.4% was formed on the under-cladding layer in the cross-sectional size of, for example, 8.0 µm×8.0 µm, and the top and side portions of the core circuit are covered with an over-cladding layer of $SiO_2$-based glass with a thickness of, for example, 30 µm.

The core circuit structure, like the circuit structure of the conventional wavelength multiplexer 2 shown in FIG. 13, has Mach-Zehnder interferometer type wavelength multiplexing means 27 connected in multiple stages by combining linear patterns and arcuate patterns with a radius of curvature of 18 mm.

In the first embodiment of the invention, because the length $L_1$ of the polarization-maintaining optical fiber 6 constituting the depolarizer 5 could be designed optimally based on the coherence length of the pumping source 1 the degree of polarization of whose output light should be canceled, the length $L_1$ of the polarization-maintaining optical fiber 6 was determined as follows.

Given that $L_c$ is the coherence length of the associated pumping source 1 and B is the value of the birefringence of the polarization-maintaining optical fiber 6 and on the assumption that the pumping light which travels through the polarization-maintaining optical fiber 6 has no crosstalk between the polarization modes, the coherence between the orthogonal polarization modes is lost when an equation 1 below is satisfied.

$$B \cdot L_1 > L_c \qquad (1)$$

Using the center wavelength $\lambda_c$ of the oscillation spectrum of the pumping source 1 and a half-wavelength width $\Delta\lambda$, the coherence length of the pumping source 1 is expressed by the following equation 2.

$$L_c = \lambda_c^2 / \Delta\lambda \qquad (2)$$

Figure 3:
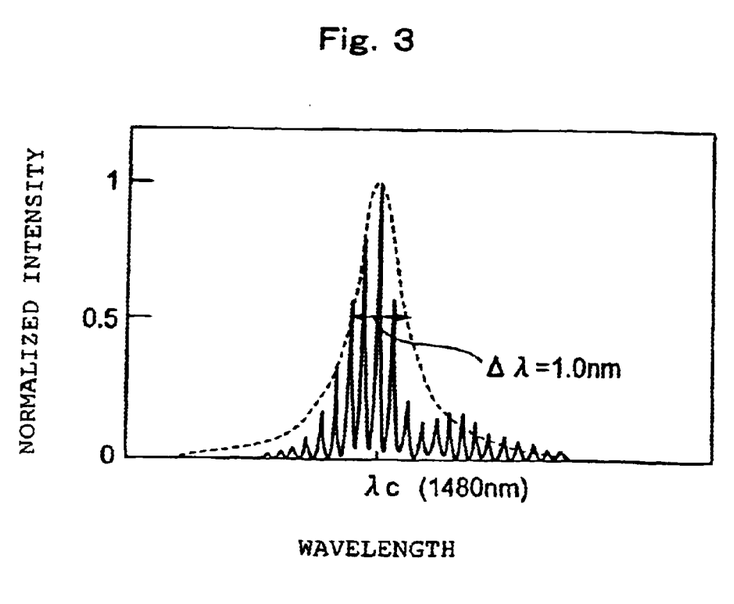
FIG. 3 is a graph exemplifying the output spectrum of a pumping source provided in the embodiment.

As the center wavelength $\lambda_c$ is 1480.0 nm and the half-wavelength width $\Delta\lambda$ is 1.0 nm in FIG. 3, for example, the coherence length $L_c$ of the pumping source 1 can be computed to be about 2.19 mm from the equation 2.

In general, the value B of the birefringence of the polarization-maintaining optical fiber is approximately equal to $4 \times 10^{-4}$. Substituting this value into the equation 1, the obtained optimal length $L_1$ of the polarization-maintaining optical fiber 6 becomes $L_1 = 5.48$ m. According to the first embodiment, therefore, the depolarizer 5 intervened between the pumping source 1 whose output light has the center wavelength $\lambda_c$ of 1480.0 nm and the wavelength multiplexer 2 was prepared by connecting the polarization-maintaining optical fiber 6 having a length of 5.48 m and the polarization-maintaining optical fiber 7 having a length of 10.96 m in series.

When linearly polarized light enters the primary optic axis of the first polarization-maintaining optical fiber 6 on the pumping-source side, pumping light is not depolarized. The depolarizer 5 should therefore be constructed so as to be able to depolarize a light which has a grate variety of incident polarization state. According to the first embodiment, therefore, the length of the polarization-maintaining optical fiber 7 is set twice the length of the polarization-maintaining optical fiber 6 and the depolarizer 5 is constructed by connecting both polarization-maintaining optical fibers 6 and 7 in such a way that the primary optic axis of the polarization-maintaining optical fiber 7 is inclined at an angle of 45° to the primary optic axis of the polarization-maintaining optical fiber 6.

As shown in FIG. 1, the center wavelengths $\lambda_c$ of the output lights of the plural pumping sources 1 differ from one another, so that for each pumping source 1, the optimal lengths of the polarization-maintaining optical fibers 6 and 7 that constitute the associated depolarizer 5 were acquired in the aforementioned manner.

Table 1 below shows the center wavelength $\lambda_c$ and the half-wavelength width $\Delta\lambda$ of the output light of each pumping source 1, the coherence length $L_c$ that is obtained by the former two values, the lengths $L_1$ and $L_2$ of the polarization-maintaining optical fibers 6 and 7 that constitute the associated depolarizer 5 and the total length of both optical fibers.

TABLE 1

| pumping sources | | | depolarizers | | total |
|---|---|---|---|---|---|
| $\lambda_c$ (nm) | $\Delta\lambda$ (nm) | $L_c$ (mm) | $L_1$ (m) | $L_2$ (m) | length (m) |
| 1450.0 | 1.0 | 2.10 | 5.26 | 10.51 | 15.77 |
| 1457.5 | 1.0 | 2.12 | 5.31 | 10.62 | 15.93 |
| 1465.0 | 1.0 | 2.15 | 5.37 | 10.73 | 16.10 |
| 1472.5 | 1.0 | 2.17 | 5.42 | 10.84 | 16.26 |
| 1480.0 | 1.0 | 2.19 | 5.48 | 10.95 | 16.43 |
| 1487.5 | 1.0 | 2.21 | 5.53 | 11.06 | 16.59 |
| 1495.0 | 1.0 | 2.24 | 5.59 | 11.18 | 16.76 |
| 1502.5 | 1.0 | 2.26 | 5.64 | 11.29 | 16.93 |

In the first embodiment, each depolarizer 5 makes the degree of polarization of the associated pumping source 1 nearly zero by determining the lengths $L_1$ and $L_2$ of the polarization-maintaining optical fibers 6 and 7 that constitute the associated depolarizer 5 and the total length of both optical fibers as given in Table 1.

As one example, the optimal lengths of the polarization-maintaining optical fibers 6 and 7 are the shortest lengths necessary to make the degree of polarization of the associated pumping source 1 nearly zero (or cancel it) and the effect of canceling the degree of polarization of the pumping source 1 does not change even if the lengths of the polarization-maintaining optical fibers 6 and 7 are set longer than the optimal lengths.

According to the first embodiment of the invention, as set forth in the foregoing description, the depolarizers 5, which make the degrees of polarization of the lights output from the associated pumping sources 1 nearly zero, are provided between the optical input fibers 9 provided at the optical input sections 2a to 2h of the wavelength multiplexer 2 and the associated pumping sources 1, respectively. The pumping lights output from the pumping sources 1 enter the wavelength multiplexer 2 after being nearly depolarized by the associated depolarizers 5 and can be multiplexed in the depolarized state by the wavelength multiplexer 2.

Therefore the wavelength-multiplexed pumping light multiplexed by and output from the wavelength multiplexer 2 is not influenced by the PDL of the wavelength multiplexer 2 and has a stable light intensity so that the output variation in wavelength-multiplexed pumping light can be suppressed. The adaptation of the wavelength multiplexing module 31 of the embodiment to an optical amplifier provided in a wavelength multiplexing transmission system can realize a high-quality wavelength multiplexing transmission system with a stable signal light intensity.

Figure 4:
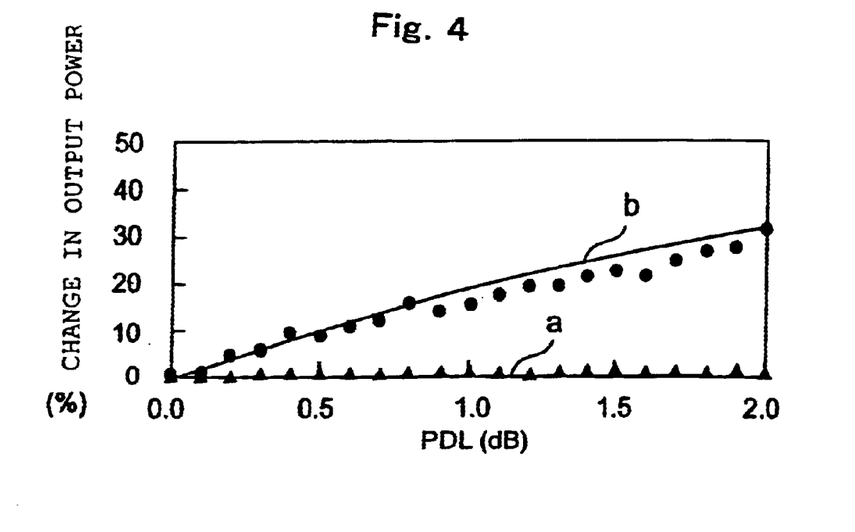
FIG. 4 is a graph showing a change in the output power of the embodiment together with a change in the output power of a conventional wavelength multiplexing module.

A characteristic curve a in FIG. 4 shows the result of plotting variations in the output power of the wavelength multiplexing module 31 acquired while various wavelength multiplexers 2 having different PDL values are used in the wavelength multiplexing module 31 of the first embodiment. As a comparative example, a characteristic curve b in FIG. 4 shows the result of plotting variations in the output power of the wavelength multiplexing module 31 which does not use the depolarizers 5 (i.e., the conventional wavelength multiplexing module 31) acquired in a similar manner.

As apparent from the comparison of the characteristic curves a and b in FIG. 4 with each other, a change in the output power of the conventional wavelength multiplexing module 31 depends on the PDL value of the wavelength multiplexer 2 and becomes larger as the PDL increases (The characteristic curve b). By way of contrast, the characteristic curve a shows that the first embodiment of the invention can normally provide stable output power which hardly changes irrespective of the PDL value of the wavelength multiplexer 2.

Figure 5:
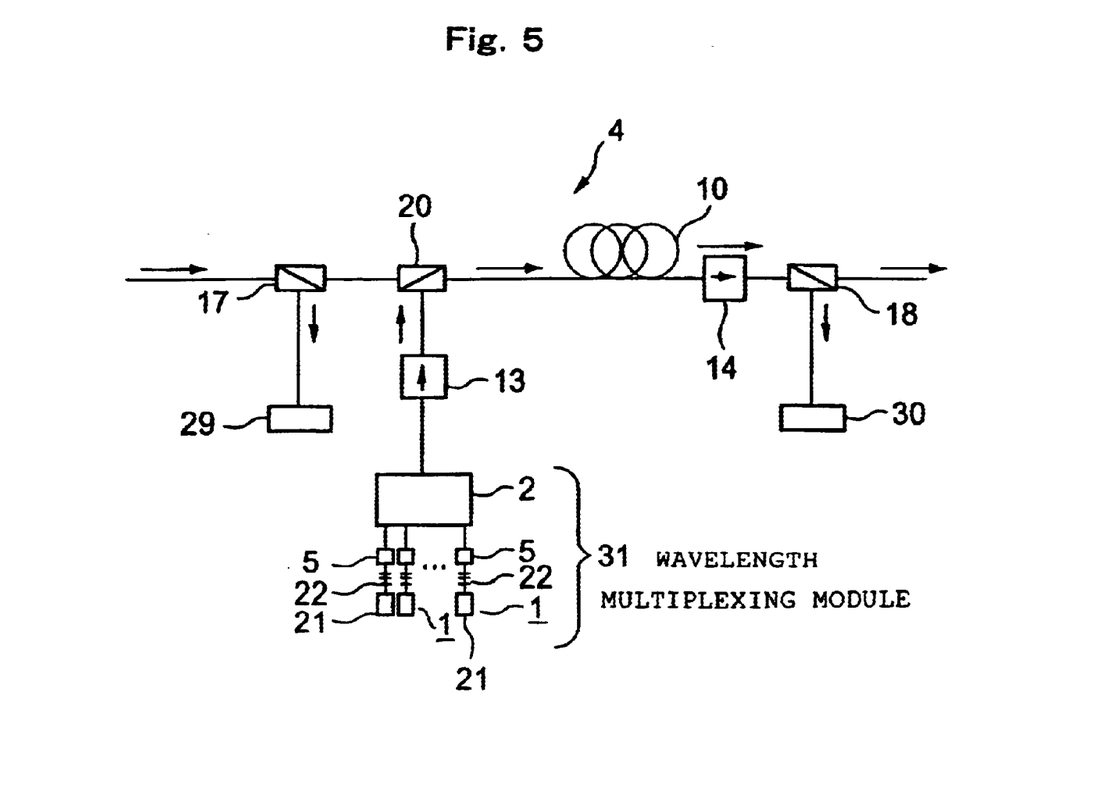
FIG. 5 is an explanatory diagram showing an example of an optical amplifier to which the wavelength multiplexing module of the embodiment is adapted and which is incorporated in a wavelength multiplexing transmission system.

FIG. 5 shows an example in which the wavelength multiplexing module 31 of the first embodiment is adapted to an optical amplifier in a wavelength multiplexing transmission system. This example uses the wavelength multiplexing module 31 of the first embodiment as the pumping source apparatus 31 of the optical amplifier shown in FIG. 12. Although the optical amplifier in the example is designed in such a way that the wavelength multiplexing module 31 ensures the forward pumping of the Er-doped optical fiber amplifier 10, the optical amplifier may be designed in such a way that the wavelength multiplexing module 31 ensures the backward pumping of the Er-doped optical fiber amplifier 10.

Because the wavelength multiplexing module 31 of the first embodiment outputs multiplexed pumping light whose wavelength lies in the 1480-nm band as mentioned earlier, the optical multiplexer 20 in FIG. 5 is so designed as to multiplex pumping light whose wavelength lies in the 1480-nm band and signal light whose wavelength lies in the 1550-nm band.

It is generally known that the insertion loss of optical components which constitute the optical amplifier 4 in the wavelength multiplexing transmission system has a polarization dependency. Referring to FIG. 5, each of the isolator 13, the optical multiplexer 20 and the wavelength multiplexer 2 has a PDL of about 0.2 dB. In the case where the depolarizers 5 are omitted from the wavelength multiplexing module 31 As shown in FIG. 5 (i.e., where the conventional wavelength multiplexing module 31 is used), the optical amplifier as a hole has a PDL of approximately 0.6 dB.

According to the first embodiment, by way of contrast, the provision of the depolarizers 5 in the wavelength multiplexing module 31 can cancel (absorb) the PDL of optical components which constitute the optical amplifier. As given in Table 2 below, therefore, the polarization of the pumping source 1 causes a power variation of 12.1% (130 mWatt in the case of 1-Watt pumping output light) without the depolarizers 5, whereas the use of the wavelength multiplexing module of the first embodiment which is provided with the depolarizers 5 can completely restrain the power variation.

TABLE 2

| depolarizers (with/without) | total PDL of components (dB) | polarization-oriented change in pumping light power | polarization-oriented change in power of 1-Watt pumping light output |
|---|---|---|---|
| without | 0.6 dB | 12.1% | 130 mWatt |
| with | 0.6 dB | 0.0% | 0 mWatt |

The adaptation of the wavelength multiplexing module of the first embodiment to the optical amplifier 4 can therefore make the amplification characteristic of the optical amplifier 4 very stable and can improve the quality of the wavelength multiplexing transmission system.

The second embodiment of the wavelength multiplexing module according to the invention will now be discussed. The second embodiment is constructed in nearly the same manner as the first embodiment and its fundamental structure is the same as shown in FIG. 1. The second embodiment differs from the first embodiment in that the depolarizer 5 intervened between each pumping source 1 and the associated optical input fiber 9 of the wavelength multiplexer 2 is constructed by connecting the polarization-maintaining optical fiber 6 with a length of 4.0 m to the polarization-maintaining optical fiber 7 with a length of 8.0 m.

In the first embodiment, the optimal lengths of the polarization-maintaining optical fibers 6 and 7 are acquired in accordance with the center wavelength and half-wavelength width $\Delta\lambda$ of each associated pumping source 1 constituting the wavelength multiplexing module 31. But, the degree of polarization of each pumping source 1 can be reduced even when the lengths of the polarization-maintaining optical fibers 6 and 7 are shorter than the optimal lengths.

In order to grasp the effects of canceling the degree of polarization while changing the lengths of the polarization-maintaining optical fibers 6 and 7, therefore, the present inventors prepared the depolarizers 5 using the polarization-maintaining optical fibers 6 and 7 of various lengths. The present inventors measured the degrees of polarization of lights output from different types of depolarizers 5 after light having a degree of polarization of 100% was incident to each depolarizer 5.

Figure 6:
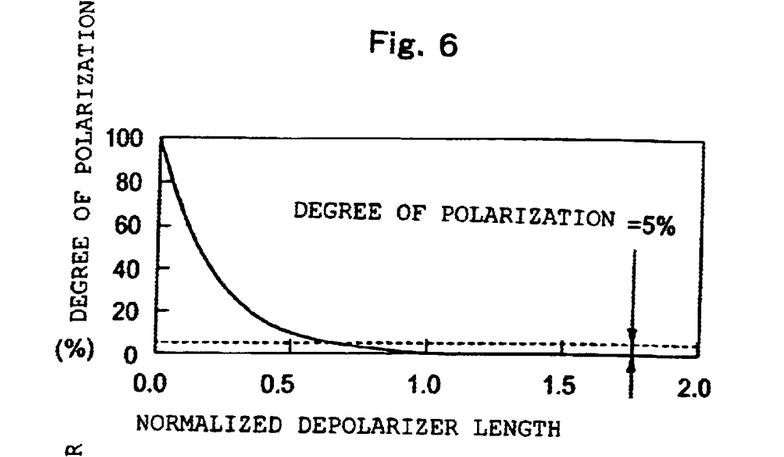
FIG. 6 is a graph showing the relationship between a normalized depolarizer length and the degree of polarization of light which is output through the depolarizer.

The results are shown in FIG. 6. In FIG. 6, the standardized depolarizer length is the value of the optimal length of the depolarizer 5 normalized to 1.0.

It is understood from the measurement that the length of the depolarizer 5 (the lengths of the polarization-maintaining optical fibers 6 and 7) needed to suppress the degree of polarization of the pumping source 1 to or below 5% is equal to or greater than 65% of the optimal length of the depolarizer 5.

According to the second embodiment of the invention, therefore, the depolarizer 5 for every associated pumping source 1 in the structure of the wavelength multiplexing module 31 shown in FIG. 1 is formed by connecting the polarization-maintaining optical fiber 6 with a length of 4.0 m to the polarization-maintaining optical fiber 7 with a length of 8.0 m in such a way that the length of the depolarizer 5 becomes equal to or greater than 65% of the optimal length of the depolarizer 5 which is given in Table 1. That is, the polarization-maintaining optical fibers 6 of the individual depolarizers 5 connected to the associated pumping sources 1 have the same length $L_1$ ($L_1$=4.0 m in the example) and the polarization-maintaining optical fibers 7 of the depolarizers 5 have the same length $L_2$ ($L_2$=8.0 m in the example).

Having the above-described structure, the second embodiment can demonstrate almost the same advantages as those of the first embodiment because of nearly the same effect of the depolarizers 5 as those of the first embodiment.

Figure 7:
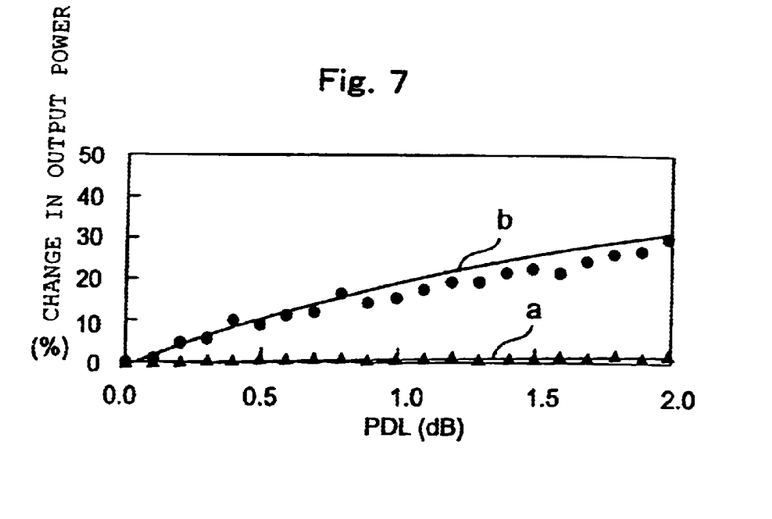
FIG. 7 is a graph showing a change in the output power of a second embodiment of the wavelength multiplexing module according to the invention together with a change in the output power of the conventional wavelength multiplexing module.

FIG. 7 illustrates a characteristic curve a showing the result of plotting variations in the output power of the wavelength multiplexing module 31 acquired while various wavelength multiplexers 2 having different PDL values are used in the wavelength multiplexing module 31 of the second embodiment as per the first embodiment. As a comparative example, a characteristic curve b in FIG. 7 shows the result of plotting variations in the output power of the wavelength multiplexing module 31 which does not use the depolarizers 5 (i.e., the conventional wavelength multiplexing module 31) acquired in a similar manner.

As apparent from FIG. 7, the second embodiment can also normally provide stable output power which hardly changes regardless of the PDL value of the wavelength multiplexer 2 and the output power variation can be suppressed to or below 2.0% even when the PDL of the wavelength multiplexer 2 is 2.0 dB. This variation is equivalent to as large as an output variation of 20 mWatt for the wavelength multiplexing pumping source having an output power of 1 Watt, and is practically negligible.

As the depolarizers 5 provided in association with the pumping sources 1 have the same structure (each using the polarization-maintaining optical fiber 6 with the same length $L_1$ and the polarization-maintaining optical fiber 7 with the same length $L_2$) in the second embodiment, the second embodiment can be manufactured more easily than the first embodiment. The depolarizers 5 have been described as having the capability of suppressing the degrees of polarization of the associated pumping sources 1 to or below 5% in the foregoing description of the second embodiment. Generally speaking, however, the degree of polarization of 10% or lower practically causes no problems. To achieve the degree of polarization of 10% or lower, the length of each depolarizer 5 should be set equal to or greater than 50% of the optimal length.

Figure 8:
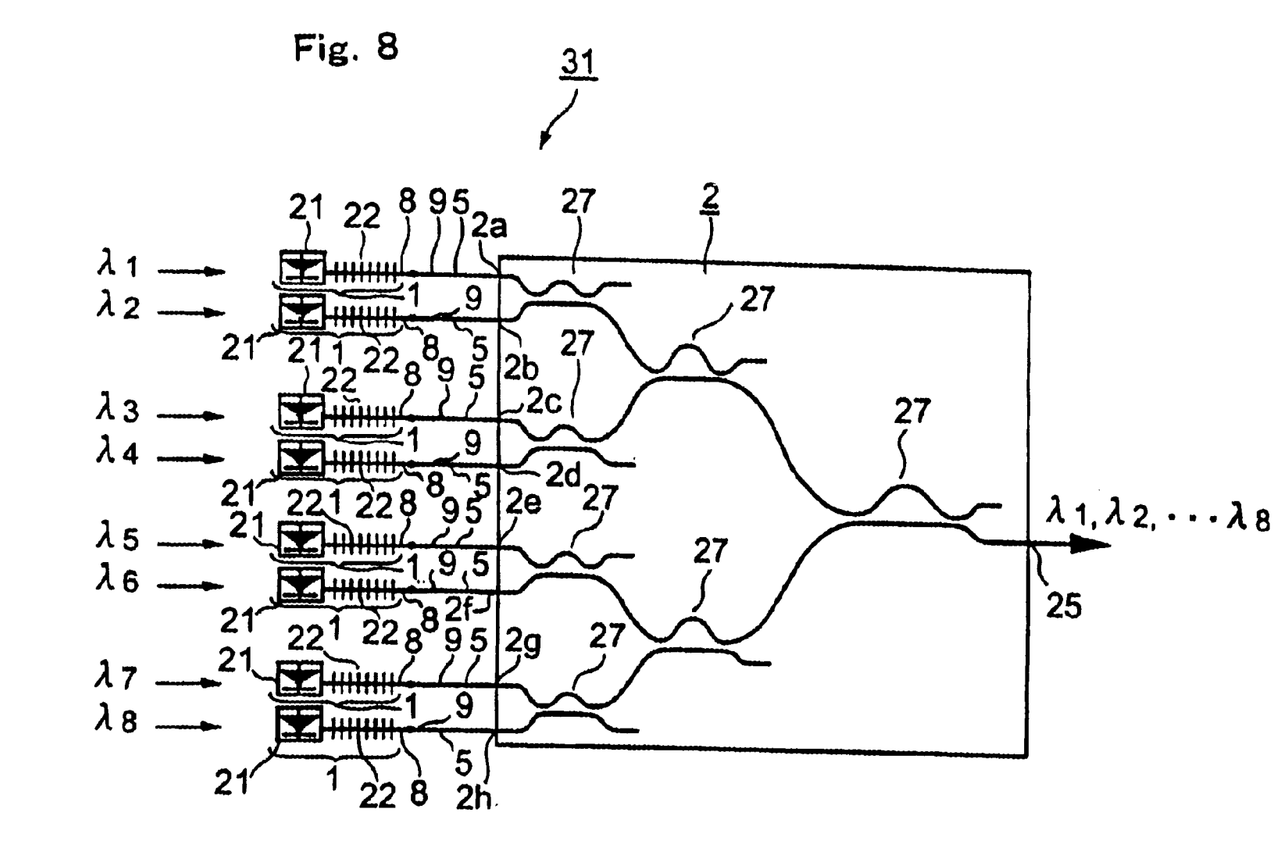
FIG. 8 is an explanatory structural diagram of a third embodiment of the wavelength multiplexing module according to the invention.

FIG. 8 shows the structure of the third embodiment of the wavelength multiplexing module according to the invention. Like the second embodiment, the third embodiment has a plurality of pumping sources 1 which output lights of different wavelengths and the wavelength multiplexer 2 that multiplexes the lights from the pumping sources 1.

The third embodiment differs from the second embodiment in that the pumping-light output fiber 8 of each pumping source 1 and the associated optical input fiber 9 of the wavelength multiplexer 2 are both constituted by a polarization-maintaining optical fiber. In the third embodiment, the pumping sources 1 are so designed as to output linearly depolarized lights of different wavelengths and the optical input fibers 9 of the wavelength multiplexer 2 serve as the depolarizers 5.

As the pumping-light output fiber 8 of the pumping source 1 is a polarization-maintaining optical fiber, the pumping-light output fiber 8 outputs linearly polarized light whose axis coincides with the primary optic axis of the pumping-light output fiber 8. Therefore, the depolarizer 5 provided in association with each pumping source 1 can be constructed by the associated optical input fiber 9 of the wavelength multiplexer 2 which is a single polarization-maintaining optical fiber.

Figure 9:
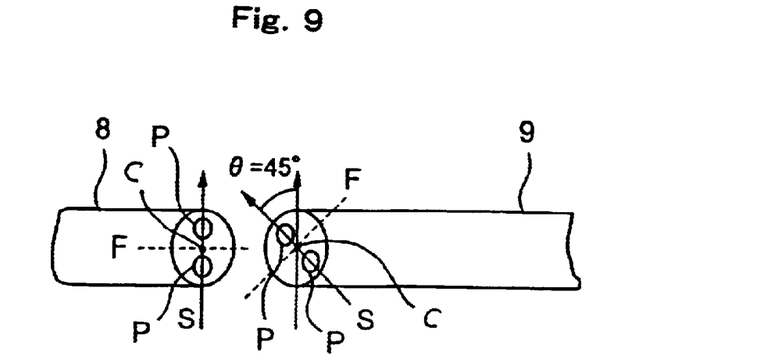
FIG. 9 is an explanatory diagram showing how an optical output fiber of a pumping source in the third embodiment is connected to an optical input fiber of a wavelength multiplexer.

Specifically, as shown in FIG. 9, each optical input fiber 9 of the wavelength multiplexer 2 is connected to the associated pumping-light output fiber 8 in such a way that the primary optic axis of the optical input fiber 9 obliquely crosses the axis of polarization of linearly polarized light from the associated pumping source 1 (the primary optic axis of the pumping-light output fiber 8) at an angle of 45 degrees. This design can reduce the degree of polarization of light output from each pumping source 1. Setting the length of each optical input fiber 9 of the wavelength multiplexer 2 equal to or longer than the optimal length $L_1$ can therefore make the degree of polarization of light output from the associated pumping source 1 nearly zero.

The third embodiment with the above-described structure can demonstrate the same advantages as those of the first and second embodiments.

Because the depolarizers 5 are constituted by the optical input fibers 9 of the wavelength multiplexer 2 in the third embodiment, the lengths of the depolarizers 5 can be made shorter, thus contributing to making the wavelength multiplexing module 31 more compact.

The wavelength multiplexing module 31 of the third embodiment is constructed by connecting the optical input fibers 9 which are the polarization-maintaining optical fibers on the output end side of the depolarizers 5 to the optical input sections of the wavelength multiplexer 2 without aligning the primary optic axes of the optical input fibers 9 with the primary optic axis of the wavelength multiplexer 2 (which is two axes extending in the horizontal and vertical directions with respect to the substrate surface in the case where the wavelength multiplexer 2 is an optical waveguide circuit).

In connecting the optical input fibers 9 formed by the polarization-maintaining optical fibers to the wavelength multiplexer 2, it is generally necessary to align the primary optic axes of the optical input fibers 9 with the primary optic axis of the wavelength multiplexer 2. According to the third embodiment, however, the optical input fibers 9 formed by the polarization-maintaining optical fibers serve as the depolarizers 5. The degree of polarization of each light to be input to the wavelength multiplexer 2 is made nearly zero by the associated optical input fiber 9 before that light enters the wavelength multiplexer 2. It is therefore unnecessary to align the primary optic axes of the optical input fibers 9 with the primary optic axis of the wavelength multiplexer 2.

The alignment of the primary optic axes of the polarization-maintaining optical fibers with the primary optic axis of the wavelength multiplexer 2 is a very difficult scheme that demands high precision. As the third embodiment of the invention can manufacture the wavelength multiplexing module 31 without requiring the alignment, it can improve the productional yield.

The invention is not limited to the individual embodiments discussed above, but may be embodied in many other specific forms. In the first and second embodiments, the primary optic axes of the polarization-maintaining optical fibers 6 and 7 that constitute the depolarizer 5 are made to obliquely cross each other at an angle of 45°. In the third embodiment, the primary optic axes of the pumping-light output fibers 8 formed by polarization-maintaining optical fibers are made to obliquely cross the primary optic axes of the optical input fibers 9 of the wavelength multiplexer 2 at an angle of 45°. However, the cross angle is not limited to 45° but may slightly deviate from 45° as long as the primary optic axes of the polarization-maintaining optical fibers do not overlap each other (the slow axes S or the fast axes F do not overlap each other or the slow axes S do not overlap the fast axes F).

Figure 10:
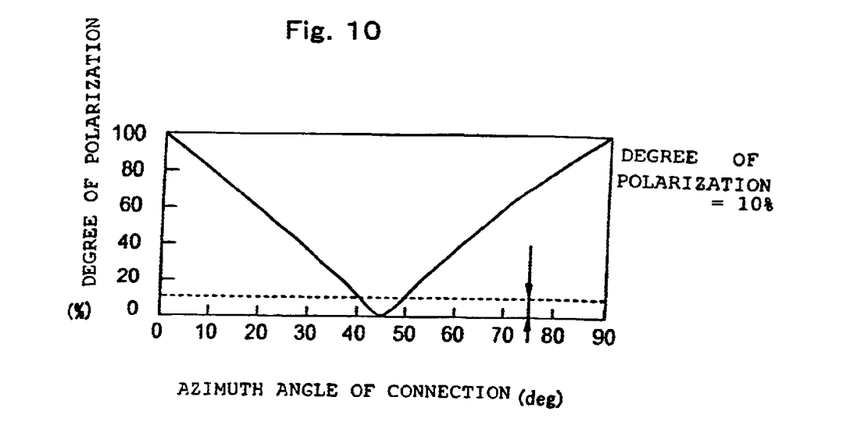
FIG. 10 is a graph showing the relationship between the azimuth angle of connection of polarization-maintaining optical fibers that constitute a depolarizer and the degree of polarization of lights that are output through the polarization-maintaining optical fibers.

FIG. 10 shows the results of checking the relationship between the cross angle (the azimuth angle of connection) of the primary optic axes at the portions where the polarization-maintaining optical fibers are connected and the degree of polarization. This figure shows the degree of polarization of light output from each polarization-maintaining optical fiber obtained when light with the degree of polarization of 100% enters the polarization-maintaining optical fiber. To suppress the degree of polarization of light output from the polarization-maintaining optical fiber to or below 10%, the polarization-maintaining optical fibers should apparently be connected together at a cross angle of 45°+4°. The degree of polarization of 10% or lower is an allowable range which practically causes no problems.

Although the degree of polarization of the pumping light output from each pumping source 1 is set to 100% in each of the above-described embodiments, the degree of polarization of the pumping light from the pumping source 1, even less than 100%, can ensure the excellent advantages of the above-described embodiments by depolarizing the output light from the pumping source 1 by the associated depolarizer 5 as done in the individual embodiments.

According to the individual embodiments, in order to adapt the wavelength multiplexing module 31 to the optical amplifier 4 having the Er-doped optical fiber amplifier 10, the wavelength multiplexing module 31 is so designed as to multiplex the pumping lights with wavelengths of the 1480-nm band and output the multiplexed light. But, the band of the wavelengths of lights to be multiplexed in the wavelength multiplexing module 31 is not particularly limited and may be set arbitrarily. Even in the case where the wavelength multiplexing module 31 is adapted to the optical amplifier 4 having the Er-doped optical fiber amplifier 10, the wavelength multiplexing module 31 may be designed, as needed, to multiplex lights whose wavelengths lie in the 980-nm band or multiplex lights whose wavelengths lie in other bands as well. Particularly, the wavelength multiplexing module of the invention is adaptable to Raman amplification and can realize Raman amplifiers of various bands (such as the C band, S band and L band). Further, the wavelength band of signal light to be amplified is not limited to the C band (1550-nm band), but the invention may be adapted to other wavelength bands as well. Furthermore, the wavelength band of signal light to be used may take other bands than the C band (1550-nm band).

Although the wavelength multiplexing module 31 comprises eight pumping sources 1 and multiplexes pumping lights output from the pumping sources 1 in each of the embodiments, the number of light sources, such as the pumping sources 1, that are provided in the wavelength multiplexing module is not limited to the particular quantity but may be set arbitrarily.

Although the wavelength multiplexer 2 is a silica-based optical waveguide circuit formed by using flame hydrolysis deposition in each of the embodiments, the wavelength multiplexer 2 should not necessarily be a silica-based optical waveguide circuit. For example, the wavelength multiplexer 2 may be constituted by a semiconductor waveguide circuit, or may be an optical waveguide circuit formed by an optical waveguide having a refractive-index distribution, which is typified by a Ti-diffused $LiNbO_3$ optical waveguide, proton exchanged optical waveguide and ion exchanged optical waveguide, or may be formed by a melt type coupler or the like.

Although the wavelength multiplexer 2 has a plurality of Mach-Zehnder interferometer type wavelength multiplexing means 27 connected in multiple stages in each of the embodiments, the circuit structure of the wavelength multiplexer 2 is not particularly restricted but may be changed as needed. For example, the wavelength multiplexer 2 can take various structures, such as a directional coupler type, arrayed waveguide grating, a waveguide circuit with a dielectric multi-layer filter inserted. With any circuit structure employed, it is possible to suppress the influence of the PDL of the wavelength multiplexer 2 and always stabilize the output power of the multiplexed light.

The wavelength multiplexing module of the invention can be adapted to a Raman amplifier as one application example. The adaptation of the wavelength multiplexing module of the invention to the wavelength multiplexing transmission system that uses Raman amplification can stabilize the amplification factor, thus making it possible to construct a high-quality wavelength multiplexing transmission system which has a stable signal light intensity as per the individual embodiments.

What is claimed is:

1. A wavelength multiplexing module comprising:
   a plurality of pumping sources for outputting lights of different wavelengths;
   a wavelength multiplexer for multiplexing the lights output from the pumping sources, the wavelength multiplexer having optical input sections for respectively receiving the lights output from the pumping sources; and
   depolarizers, respectively provided between the optical input sections and the pumping sources,
      wherein each of the depolarizers causes a degree of polarization of the light output from an associated one of the pumping sources to approach zero;
      each depolarizer has two polarization-maintaining optical fibers connected in series on an optical path in such a way that primary optic axes of the polarization-maintaining optical fibers obliquely intersect each other;
      a length $L_1$ of a pumping-source side one of the two polarization-maintaining optical fibers is so set as to satisfy $B \cdot L_1 > L_c$ where $L_c$ is a coherence length of the pumping sources and B is a value of a birefringence of the polarization-maintaining optical fibers; and
      the length $L_1$ of the pumping-source side polarization-maintaining optical fiber is set to the shortest length that satisfies $B \cdot L_1 > L_c$ and a length $L_2$ of a wavelength-multiplexer side one of the two polarization-maintaining optical fibers is set equal to or greater than twice the length $L_1$ of the pumping-source side polarization-maintaining optical fiber.

2. A wavelength multiplexing module comprising:
   a plurality of pumping sources for outputting lights of different wavelengths;
   a wavelength multiplexer for multiplexing the lights output from the pumping sources, the wavelength multiplexer having optical input sections for respectively receiving the lights output from the pumping sources; and
   depolarizers, respectively provided between the optical input sections and the pumping sources,
      wherein each of the depolarizer causes a degree of polarization of the light output from an associated one of the pumping sources to approach zero;
      each depolarizer has two polarization-maintaining optical fibers connected in series on an optical path in such a way that primary optic axes of the polarization maintaining optical fibers obliquely intersect each other;
      a length $L_1$ of a pumping-source side one of the two polarization-maintaining optical fibers is set equal to or greater than 50% of a shortest length that satisfies $B \cdot L_1 > L_c$ where $L_c$ is a coherence length of the pumping sources and B is a value of a birefringence of the polarization-maintaining optical fibers;
      a length $L_2$ of a wavelength-multiplexer side one of the polarization-maintaining optical fibers is set equal to or greater than twice the length $L_1$ of the pumping-source side polarization-maintaining optical fiber;
      the lengths $L_1$ of the pumping-source side polarization-maintaining optical fibers respectively connected to the plurality of pumping sources are set equal to one another; and
      the lengths $L_2$ of the wavelength-multiplexer side polarization-maintaining optical fibers connected to the wavelength multiplexer are set equal to one another.

3. A wavelength multiplexing module comprising:
   a plurality of pumping sources for outputting lights of different wavelengths;

a wave length multiplexer for multiplexing the lights output from the pumping sources, the wavelength multiplexer having optical input sections for respectively receiving the lights output from the pumping sources; and depolazizers, respectively provided between the optical input sections and the pumping sources, wherein each of the depolarizer causes a degree of polarization of the light output from an associated one of the pumping sources to approach zero;

each depolarizer has one or more polarization-maintaining optical fibers provided on an optical path; and output-end side polarization-maintaining optical fibers of the depolarizers are connected to the wavelength multiplexer without aligning primary optic axes of the output-end side polarization-maintaining optical fibers with a primary optic axis of the wavelength multiplexer.

* * * * *